United States Patent [19]

King, Sr.

[11] 4,241,747

[45] Dec. 30, 1980

[54] SAFETY VALVE HAVING A RUPTURABLE HOUSING

[76] Inventor: Lloyd H. King, Sr., 311 Blake Rd., Hopkins, Minn. 55343

[21] Appl. No.: 956,624

[22] Filed: Nov. 1, 1978

[51] Int. Cl.³ ............................................. F16K 17/40
[52] U.S. Cl. .................................. 137/68 R; 137/202; 137/433
[58] Field of Search ..................... 220/89 A; 73/738; 137/68 R, 69, 70, 71, 202, 433, 797

[56] References Cited

U.S. PATENT DOCUMENTS

| 812,451 | 2/1906 | Rice | 137/202 |
| 2,332,680 | 10/1943 | Wallace | 137/202 X |
| 3,520,192 | 7/1970 | Condie | 73/738 |

Primary Examiner—Martin P. Schwadron
Assistant Examiner—Richard Gerard
Attorney, Agent, or Firm—Jacobson and Johnson

[57] ABSTRACT

A two fluid safety valve having a two part housing with a float therein that closes a gas port in response to a liquid head in the valve to prevent fluid from flowing through the gas port but opens the gas port to allow gas ingress or egress when the liquid head is less than a predetermined value. The two part housing comprises two members that are bonded to each other to separate when the pressure in the valve exceeds a predetermined value.

1 Claim, 4 Drawing Figures

SAFETY VALVE HAVING A RUPTURABLE HOUSING

BACKGROUND OF THE INVENTION

1. Field of the Invention

This invention relates generally to valves and, more specifically, to a safety valve that opens or closes in response to a liquid head but allows only gas to flow therethrough when in the open position.

2. Description of the Prior Art

One of the prior art needs is a relief valve that protects system components but allows gas to enter and leave a system when the liquid level or head is below a predetermined level in the valve yet prevents gas or liquid from discharging from the system when the liquid level in the system is above a predetermined level.

SUMMARY OF THE INVENTION

Briefly, the present invention comprises a fluid safety valve having a float that seals a gas port in response to liquid in the system reaching a predetermined level. When the level of liquid is less than a predetermined level, the float drops thereby unsealing the gas port to allow gas to flow through the gas port. The housing comprises two components that are bonded together to form a closed chamber. By controlling the strength of the bond between the two members by ultrasonic welding or the like one obtains a safety valve that separates along the bond when a predetermined pressure is exceeded.

DESCRIPTION OF THE PREFERRED EMBODIMENT

Figure 1:
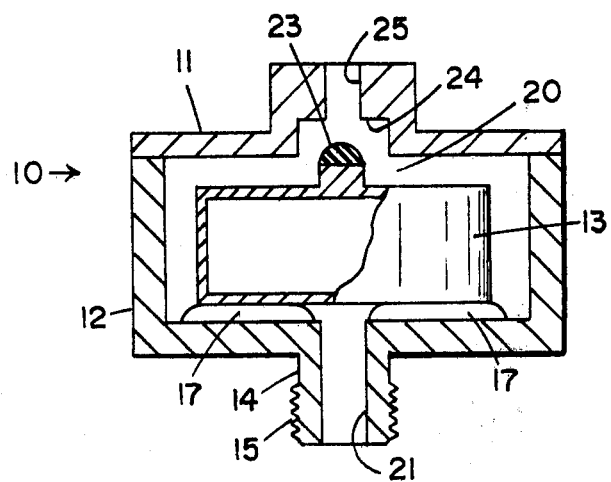
FIG. 1 is a cross sectional view of my two fluid safety valve in the open position.

Referring to FIG. 1, reference numeral 10 designates my two fluid safety valve comprising an upper member 11 having a gas port 25 and a lower chamber housing 12 having a cylindrical chamber 20 therein with a cylindrical float 13 located in chamber 20. It should be understood that the term fluid is used in its common meaning to denote either a liquid or a gas. Chamber housing 12 includes an extension 14 having a fluid port 21 therein. Extension 14 includes a threaded section for attachment to a system or the like.

Located on the lower interior surface of chamber housing 12 are a set of radially spaced ribs 17 which support float 13 in a spaced relationship from the bottom of chamber 20 to thereby allow radial flow of fluid beneath float 13 when float 13 is in the down position shown in FIG. 1. Float 13 moves up and down within chamber 20 in response to the liquid level in chamber 20. However, because float 13 is heavier than the force generated by the momentum of the gases flowing through chamber 20, float 13 does not move up and down in response to gas flowing through chamber 20.

Located on top of float 13 is a neck and a resilient hemispheric sealing member 23 that is operable to sealingly engage sealing shoulder 24. While resilient sealing member 23 is mounted on float 13, it is apparent that the resilient sealing member, 23, could be interchanged with sealing shoulder 24. A hemispheric sealing member is shown; however, other configurations or shapes are also suitable for use in my valve. In the down position as shown in FIG. 1, (no liquid in chamber 13) gas flows through inlet 21 radially outward between ribs 17, vertically upward along the sides of float 13, across the top of float 13 and discharges through gas port 25. If the system pressure is less than atmospheric pressure, gas flows in the opposite direction through port 25, around float 13, and out fluid port 21. In either case it is apparent that there is a two way flow of gas through valve 10.

Figure 2:
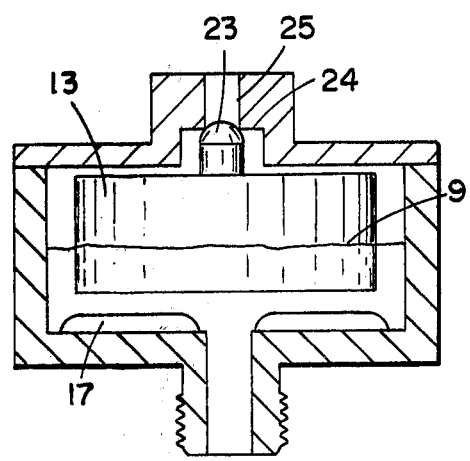
FIG. 2 is a cross sectional view of my two fluid safety valve in the sealed position.

When a liquid enters chamber 20, as shown in FIG. 2, float 13 rises. As float 13 rises, it forces sealing member 23 against sealing shoulder 24 thereby preventing flow of fluid through gas port 25. Sealing output 25 allows pressure to build up to the desired level within the system. Should the liquid level in the system decrease sufficiently to allow float 13 to drop downward onto ribs 17, the gas in the system can again flow either in or out of port 25. It is thus apparent my valve closes when the liquid level reaches a predetermined value but opens when the liquid level decreases beyond a predetermined value. It should be understood that in normal operation, gas pressure is insufficient to hold float 13 in the up position.

Figure 3:
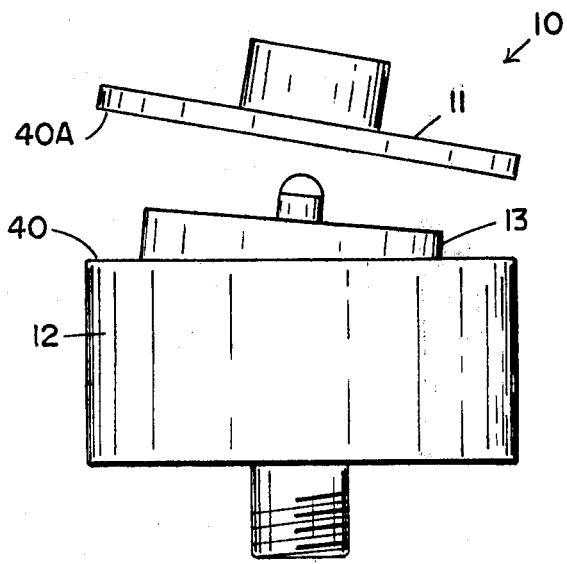
FIG. 3 is a partially exploded view showing my two fluid safety valve after rupture.

FIG. 3 shows my safety valve in an exploded view immediately after reaching a condition of excess system pressure. In the preferred embodiment, top member 11 and housing 12 are formed from a polymer plastic material. Top member 11 separates from chamber housing 12 along surfaces 40 and 40a. Typically, chamber housing 12 and member 11 are bonded together at surface 40 and 40a by sonic welding or the like; however, other means of sealing such as solvent sealing are within the scope of the invention. Still other means of providing a rupturable section is through use of a weakened wall section of the valve or a thinner wall section of the valve wall. To insure that pressure relief is substantial enough to protect the system, the area of the rupturable section should be larger than the inlet area into valve 10.

Making chamber housing 12 and member 11 of a polymer plastic permits controlling the strength of the bond between surface 40 and 40a. I have found that I can control the time of ultrasonic welding to allow one to provide bonded joints of a desired strength which is less than the strength of the materials, i.e. the weakest portion of my valve is the bond between member 11 and housing 12. By having a safety valve with a bonded joint whose strength is less than the materials in the valve permit the member 11 to separate from chamber housing 12 when the pressure in my valve reaches a predetermined level. In experiments, pressure ranges of 80 psi to 100 psi have been selected as levels for the member 11 to rupture from chamber housing 12. After valve rupture, the fluid pressure of the system decreases thus eliminating the possibility of rupturing the system.

Figure 4:
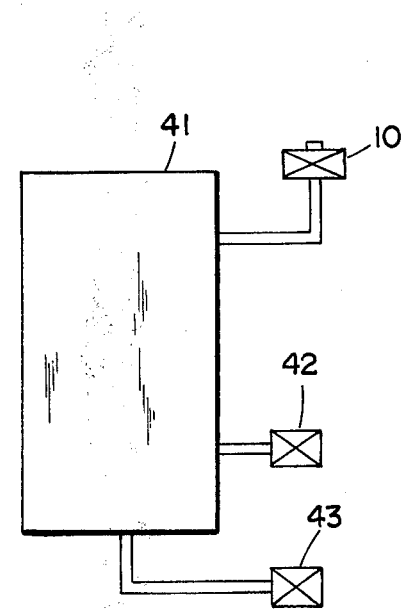
FIG. 4 is a tank having two fluid safety valve thereon.

FIG. 4 shows a typical system having a fluid tank 40 with a fluid inlet 43 and a fluid outlet 42. My safety valve 10 connects to the top of tank 40 and provides for ingress and egress of air to the system as well as a rupturable section that relieves pressure in the system should the fluid pressure exceed a predetermined value.

Although float 13 moves up and down in response to the level of fluid in the system, there are operating conditions when one may not desire the float to unseat even though the liquid level decreases below the valve that produces float seating. If the forces generated by the pressure differential across the float are greater than the weight of the float, the float will not unseat. By controlling the diameter of gas port 25 one can determine the pressure level where the float will not unseat. The area of gas port 25 has a direct relationship to the operating system pressure at which the float will not unseat. Therefore, by selecting a given output area, one can maintain the float in the closed position when the pressure in chamber exceeds a certain value. If we denote the outlet area of gas port 25 as A, then the system pressure above which the float will not unseat, even though the liquid level may drop, is denoted as P. If A increases, then P decreases and similarly if A decreases, then P increases. Therefore, by controlling the output area A I can control the system pressure at which the float unseats. While polymer plastics are used in the preferred embodiment, under certain conditions metals are suitable for use in manufacture of my safety valve.

I claim:
1. A two fluid valve comprising:
a first member formed from a polymer plastic material, said first member having a gas port therein, said first member having a surface for forming sealing engagment with another surface;
a second member, said second member formed from a polymer plastic material, said second member having a fluid port therein, said second member having a surface for mating with said surface on said first member to thereby provide a sealing region between said surface on said first member and said surface on said second member, said sealing region having means operable for securing said first member to said second member so that said surface on said first member will separate from said surface on said second member in response to a predetermined pressure in said two fluid valve, said first member and said second member coacting to form a housing when said surface on said first member is in mating engagement with said surface on said second member, said housing defined by said first member and said second member, said housing having a float chamber therein for containing a float member, said first member including a sealing shoulder on said gas port to permit a sealing member to seal off said gas port in said first member in response to the level of a liquid in said chamber;
said fluid port in said second member operable for the ingress and egress of fluid into the float chamber in said housing;
a float of predetermined volume located in the float chamber, said float comprising a polymer plastic material, said float having a weight which is less than a weight of the volume of liquid displaced by said float but greater than weight of the volume of gas displaced by said float, a gas port sealing member located on said float for sealing said gas port in response to liquid reaching a predetermined level in the float chamber to thereby prevent discharge of fluid through said gas port, said sealing member having a sufficiently short projection so that the tilting of said two fluid valve does not produce misalignment of said sealing member with said gas outlet port;
said housing including members for supporting said float in a spaced position from said fluid port to permit ingress and egress of fluid past said float when said float is located on said supporting members whereby said two fluid valve is operable for normally permitting ingress and egress of gas through said gas port when the liquid level in the float chamber is insufficient to force said sealing member on said float into sealing contact with said shoulder on said gas port and for normally not permitting ingress and egress of fluid through said gas port when the liquid level in said float chamber is sufficient to force said sealing member on said float into sealing contact with said shoulder on said gas port;
said sealing region securing means between said first member and said second member forming a region of minimum strength so that when said sealing member on said float chamber is in sealing contact with said sealing shoulder on said gas port, said region of minimum strength is operable for rupture at a predetermined pressure level to thereby prevent damage to a system connected thereto should the pressure exceed said predetermined pressure level.

* * * * *